April 21, 1942. T. M. HALSALL 2,280,074
MANUFACTURE OF HOLLOW ARTICLES
Filed Feb. 17, 1941
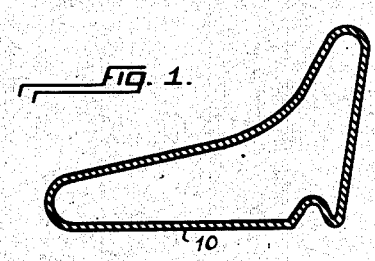
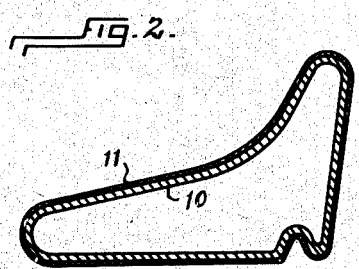
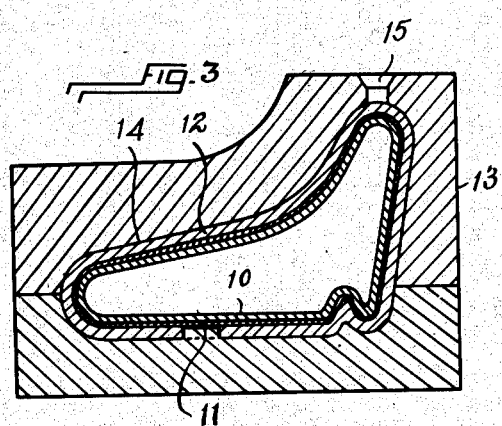
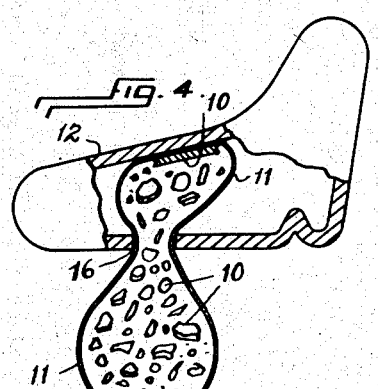
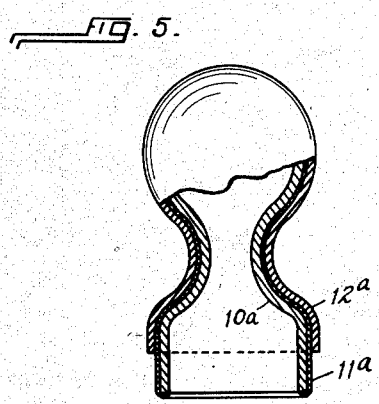
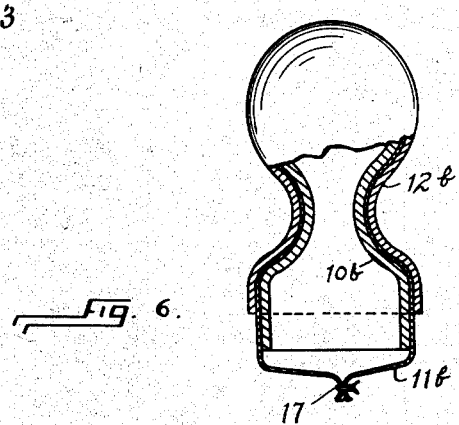
INVENTOR
THOMAS M. HALSALL
by Christy, Parmelee and Strickland
his attorneys Patented Apr. 21, 1942

2,280,074

UNITED STATES PATENT OFFICE 2,280,074

MANUFACTURE OF HOLLOW ARTICLES

Thomas M. Halsall, Latrobe, Pa., assignor to Toyad Corporation, Latrobe, Pa., a corporation of Pennsylvania Application February 17, 1941, Serial No. 379,175

11 Claims. (Cl. 18—45)

This invention relates to the manufacture of hollow articles by forming the article around a frangible core, which core is surrounded by a flexible material so that after the article has been formed, all the core forming material may be removed along with and inside of the surrounding sack of flexible material. The invention resides in the core itself and in the use of it in the formation of hollow articles.

Amongst the objects of my invention is the production of a core to be used in the formation of hollow articles, the inside surfaces of which closely follow the details of the desired shape, and to ensure the complete removal, from the formed articles, of the material forming the core.

It is common practice to form hollow articles by coating a mold or core with desired moldable compositions. Where the core is to be removed through a relatively small opening frangible hollow cores have been employed and the easily broken material may be vitreous or other fragile material. Where a larger opening is available the core may be made either hollow or of solid readily broken material. In general the thickness of the core wall, where hollow cores are employed is preferably just enough to give sufficient rigidity and strength to withstand without deformation or breaking the strains exerted by the molding operation, although it is obvious that the cores may have greater thickness.

Difficulty has been experienced in removing all the material comprising the core from the interior of the molded article after the core has served its purpose during the molding operation. It is frequently very undesirable for fragments of the core to remain in the completed article. For example, if the article is formed of sponge rubber, over a core of material such as glass which breaks up into jagged or rough edged fragments, such fragments if not entirely removed are liable to seriously impair the desired qualities of the completed article, or may even render it dangerous. Again, if the hollow article is to contain mechanism, fragments of the core material inadvertently remaining inside the article may impair the working of the mechanism.

By the use of the present invention, it is possible to absolutely ensure that all the core material will be removed from the interior of the hollow article. I propose to form around the core a deformable covering which will surround the core material. The covering coat which I prefer to be elastic, may conveniently be made of latex and applied to the outside of the core, for example, by spraying on, or dipping the core in a proper solution of latex.

The finished article is then formed from the desired material which is applied over the flexible covering on the core or mould. Thereafter the core is broken inside its covering sack. The sack and the broken up core material which is inside the sack is next removed from the formed article through an opening conveniently located therein. The article may itself be formed from any suitable substance, such as rubber, plaster, papier-mâché, or organic plaster applied in any desired way, such as by molding, spraying, dipping, etc.

In instances where for example, it is convenient to leave a large opening in the molded article the flexible covering need not form a closed sack around the core. In such instance it is sufficient to completely cover the part of the core which projects into the mold by an open ended sack the open end projecting beyond the confines of the article to be molded.

In the accompanying drawing I have shown for purposes of illustration only, certain presently preferred embodiments of my invention.

Figure 1 is a view in section of a hollow core of the dimensions desired to form the interior of a hollow article;

Figure 2 is a view in section showing the core covered with a flexible covering;

Figure 3 is a view in section showing the completed article in the outside mold in which it is formed, and with the core still inside;

Figure 4 is a view, partly in section, showing the completed article, with the core broken and being removed inside and with the flexible covering;

Figure 5 is a view partly in section showing a hollow article of a different shape with the frangible core and flexible covering still inside, and Figure 6 represents a modification of the invention somewhat similar to that shown in Figure 5.

In the drawing wherein like reference numerals are applied to similar parts in the several views, the numeral 10 indicates a core or mold which is represented as being hollow. This core is made from a frangible material such as plaster of Paris, glass, clay, etc., and by any desired operation. It is made thick enough to enable the core to withstand the strains imposed on it by the operations incident to forming the desired article around the core. The outline of the core corresponds to the desired contour of the inside of the article to be formed therearound. It is also within contemplation to make the core substantially solid, so long as it may be readily broken up as desired at the end of the article forming operation.

The frangible or shatterable core or supporting member 10 has applied thereto a flexible coating or layer 11. The coating or skin may be formed from an elastic material such as rubber, applied in any way, for example by dipping in a suitable latex mixture or by spraying such a mixture on the outside of the core. I prefer to use a thin coating, but a relatively thick coating may in many cases be advantageously employed. In most instances it is desirable that the latex be applied so as not to adhere to the core material, although in other instances such a practice is not necessary. Methods of applying latex are well known and in common use.

The material for forming the completed article 12 is applied directly over the outer surface of the flexible covering 11. The material may be, rubber, plaster of Paris, papier-mâché, organic plastic, or even metal, and may be applied in any known way such as by dipping, spraying, plastering, molding, etc. In Figure 3 a molding operation is diagrammatically shown. There the flexibly covered core 10—11 is placed inside a suitably contoured mold 13, the inner surface 14 of which is contoured to the outside shape of the completed article desired. The core is placed in the mold cavity so that the outer surface of the flexible covering 12 is the desired distance from the inner surface 14 of the mold. The intervening space is then filled through the opening 15 with the desired material to form the article to be molded.

Instead of using an outer mold the article forming material may be applied over the covered core by spraying, dipping, plastering, etc. After the article has been formed, the frangible material forming the core 10 is broken up, inside the flexible closed sack 11 and the sack and the broken core inside of it are removed through an opening 16 in a convenient location in the wall of the formed article 12. The opening may be smaller than the dimensions of the formed article. The operation is illustrated in Figure 4.

Where a large opening is available in the finished article, the arrangement shown in Figure 5 may be employed. The core 10a extends beyond the article 12a, and the flexible coating 11a is applied as by spraying or dipping over the core so as to form in effect, an open end sack.

In the modification shown in Figure 6, the sack 11b, surrounding the frangible core 10b, is formed from sheet material, such as sheet rubber or an open end sack which is stretched over the core 10b and the ends tied at 17 to form a closed sack.

When the article is formed as shown in either Figure 5 or Figure 6, the frangible core is removed while inside the flexible sack.

Either of these modifications is useful where the finished article is formed by methods other than by the employment of an outer mold as shown in Figure 3. Spraying, dipping, and plastering, for example may be advantageously used.

While I have described certain preferred embodiments of my invention it is to be understood that various changes may be resorted to within the scope of the following claims.

I claim as my invention:

1. A core for use in forming hollow articles, comprising an inner portion of frangible material and an overlying coating of flexible material in contact with the inner portion.

2. A core for use in molding, comprising a shatterable supporting member and an overlying flexible coating.

3. A core for use in molding, comprising a hollow supporting member formed of frangible material and an overlying flexible layer.

4. A core for use in molding, comprising a hollow supporting member formed of frangible material and an overlying flexible layer entirely surrounding the member.

5. A core for use in molding, comprising a hollow supporting member formed of frangible material enclosed in a rubber sack.

6. A core for use in forming hollow articles, comprising an inner portion of frangible material which extends beyond the article to be formed, and a coating of flexible material overlying the inner portion.

7. The method of forming a hollow article having an oening therein communicating with the interior thereof, which comprises forming a core of shatterable material, covering the material with an overlying flexible coating, forming the article on the coating, shattering the core and thereafter removing the core fragments from the article with and inside the coating.

8. The method of forming a hollow article having an opening therein communicating with the interior thereof, which comprises forming a core of a shatterable material, covering the material with an overlying flexible coating, forming the article on the coating, thereafter removing the core along with the skin through said opening.

9. The method of molding a hollow article having an opening leading to the interior thereof, which comprises shaping the moldable material about a shatterable core encased with a form fitting flexible skin, thereafter shattering the core and removing the core fragments enclosed within the skin through said opening.

10. The method of molding a hollow article having an opening leading to the interior thereof, which comprises shaping the moldable material about a shatterable core encased within a form fitting flexible skin, thereafter shattering the core and removing the core fragments along with the unbroken skin through said opening.

11. The method of molding a hollow article having an opening leading to the interior thereof, which comprises shaping the moldable material about a shatterable core encased within a form fitting flexible skin, thereafter shattering the core and removing the core fragments enclosed within the skin through said opening, said opening being smaller than the dimensions of said hollow article.

THOMAS M. HALSALL.